United States Patent [19]

McKee

[11] Patent Number: 5,516,191
[45] Date of Patent: May 14, 1996

[54] DESK STRUCTURE

[76] Inventor: Carl B. McKee, 29971 Homeland Ave., New Hudson, Mich. 48165

[21] Appl. No.: 133,885

[22] Filed: Oct. 12, 1993

[51] Int. Cl.⁶ ..................................................... A47C 7/62
[52] U.S. Cl. ................ 297/188.15; 297/145; 297/188.17
[58] Field of Search ................... 297/188.15, 188.16, 297/188.14, 188.17, 188.18, 188.19, 188.2, 188.21, 145; 108/25, 44; 312/235.8

[56] References Cited

U.S. PATENT DOCUMENTS

| | | |
|---|---|---|
| 2,845,113 | 7/1958 | Keel . |
| 2,934,391 | 4/1960 | Bohnett . |
| 3,109,537 | 11/1963 | Larkin . |
| 3,338,629 | 8/1967 | Drees ................................ 312/235.8 |
| 3,589,577 | 6/1971 | Basinger . |
| 3,804,233 | 4/1974 | Gregg, Jr. . |
| 3,909,092 | 9/1975 | Kiernan . |
| 3,922,973 | 12/1975 | Sturgeon . |
| 4,053,133 | 10/1977 | Kauffman . |
| 4,359,004 | 11/1982 | Chappell . |
| 4,371,138 | 2/1983 | Roberts . |
| 4,417,764 | 11/1983 | Marcus et al. . |
| 4,524,701 | 6/1985 | Chappell . |
| 4,575,149 | 3/1986 | Forestal et al. . |
| 4,577,788 | 3/1986 | Richardson . |
| 4,619,386 | 10/1986 | Richardson . |
| 4,765,583 | 8/1988 | Tenner . |
| 4,795,210 | 1/1989 | Milat . |
| 4,842,174 | 6/1989 | Sheppard et al. . |
| 4,842,235 | 6/1989 | Brown et al. . |
| 4,942,827 | 7/1990 | Norgaard ..................... 297/188.21 X |
| 4,946,120 | 8/1990 | Hatcher . |
| 4,976,204 | 12/1990 | Konkle . |
| 5,071,049 | 12/1991 | Mozer . |
| 5,085,153 | 2/1992 | McKee . |
| 5,116,099 | 5/1992 | Kwasnik et al. ..................... 297/188.15 |
| 5,127,339 | 7/1992 | Hood, Jr. . |
| 5,205,452 | 4/1993 | Mankey . |
| 5,372,403 | 12/1994 | Puerto ................................ 297/188.17 |

FOREIGN PATENT DOCUMENTS

| | | |
|---|---|---|
| 2818035 | 11/1979 | Germany . |
| 3143957 | 5/1983 | Germany ............................ 297/188.2 |
| 1247237 | 10/1989 | Japan . |
| 1384440 | 2/1975 | United Kingdom . |

*Primary Examiner*—Laurie K. Cranmer
*Attorney, Agent, or Firm*—Howard & Howard

[57] ABSTRACT

A desk structure for use in association with vehicles, exemplified by an automobile, which is so constructed as to be positioned in substitution for the conventional swingable arm rest, or to be seated in a cavity formed in the typical arm rest or console. Means are provided for adjustably pivoting the desk structure into various positions, and for locking or securing the desk in the position selected. Cavities are provided in the desk structure for receiving a variety of accessories, exemplified by personal communication means such as a cellular telephone, telecopier, pager, computer, and the like. In accordance with the invention, the cavities and accessories are so positioned with respect to the vehicle driver as to permit their use without interference with or distraction from safe operation of the vehicle.

20 Claims, 3 Drawing Sheets

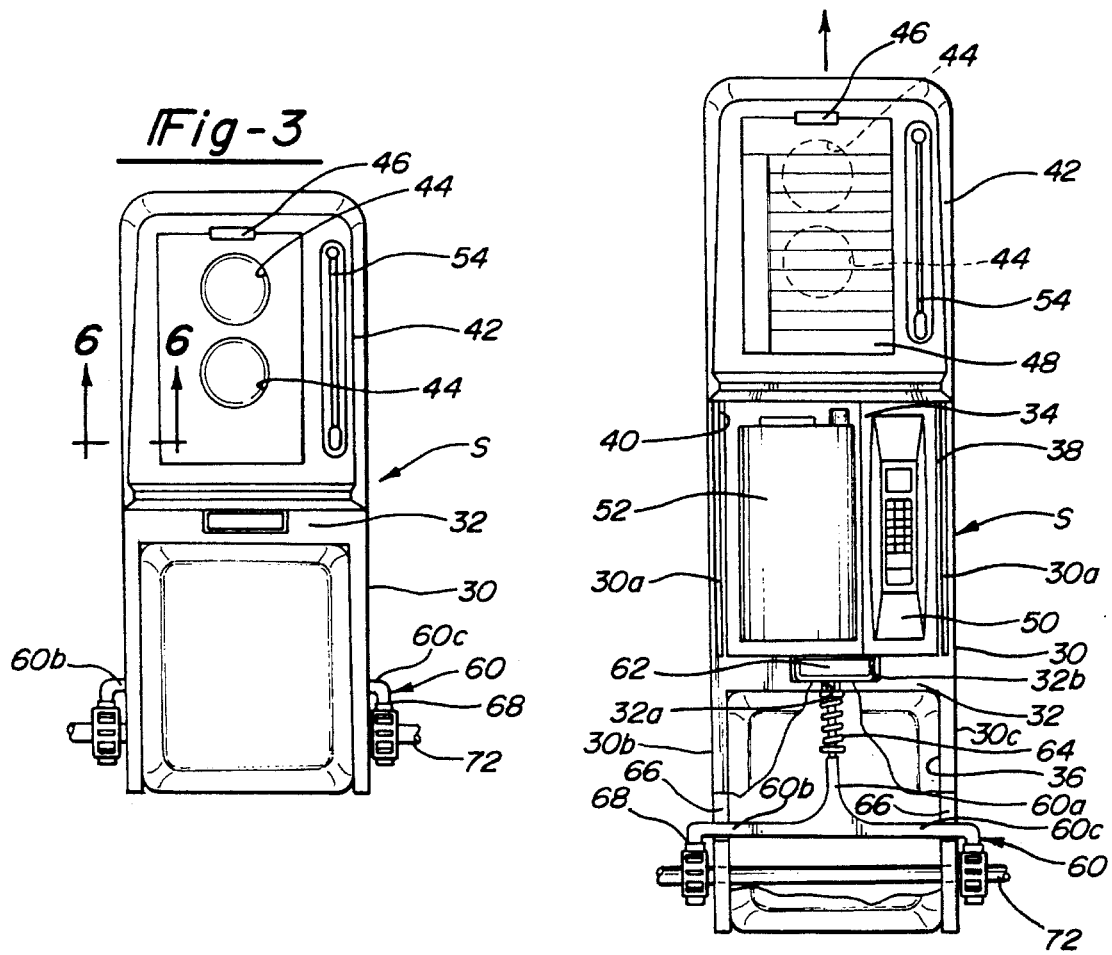
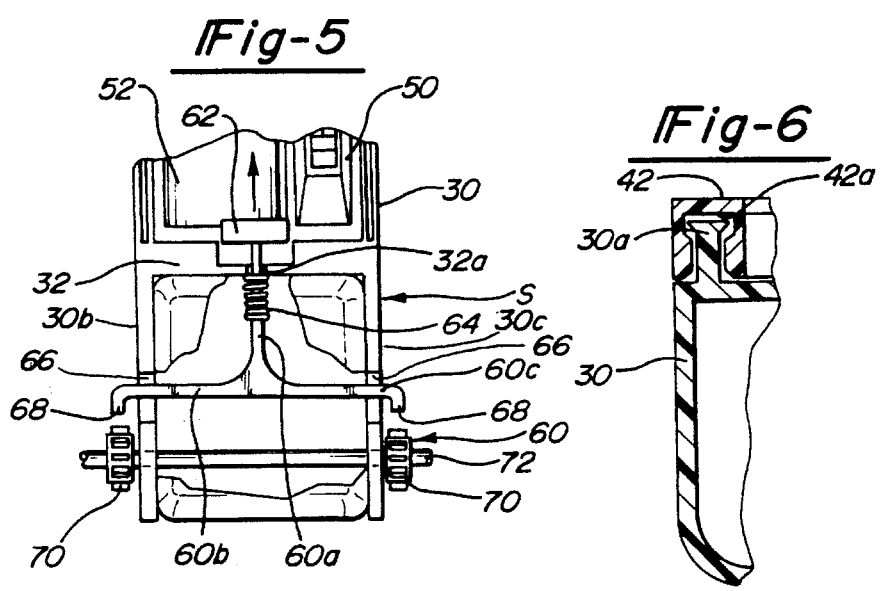

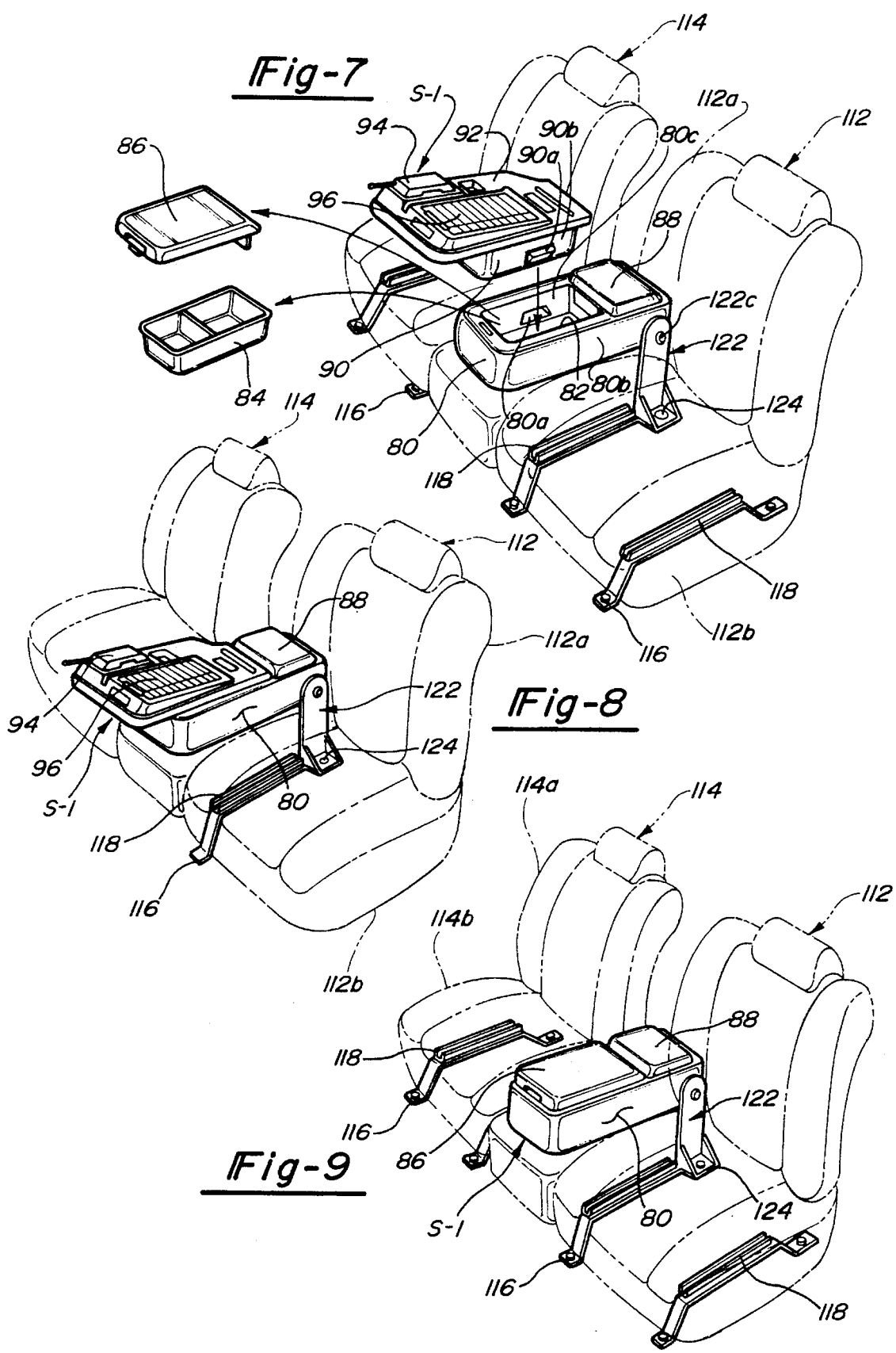

DESK STRUCTURE

BACKGROUND OF THE INVENTION

The introductory paragraphs in my U.S. Pat. No. 5,085, 153 make reference to prior art structures, and set forth certain of the inherent deficiencies therein. The descriptive portion of my noted patent then details the novel structural arrangement by means of which the disadvantageous characteristics of earlier desks have been avoided. More specifically, the patented desk structure is constructed to be removably seated in the console area of a vehicle, preferably upon the swingable or tiltable arm rest between the driver and passenger seats. The described desk structure comprises a generally box-like base framework fixedly mounting thereon a substantially flat top member provided with a plurality of cavities for receiving such objects as a writing tablet, cushion means, and mobile telephone or other personal communication apparatus.

While the desk structure of U.S. Pat. No. 5,085,153 has fulfilled a need long existing in the art, I have now discovered that the arm rest itself provides a novel situs for the disposition and transport of communication apparatus exemplified by a cellular telephone and a power source therefor, a writing tablet or the like, and other accessories normally housed in the arm rest or in the vehicular console storage space. The desk structure of this invention may be in substitution for the conventional tiltable or swingable arm rest, or may be seated in a cavity formed in an arm rest. Means may be provided for indexing the desk structure into a predetermined position, and locking the same therein.

SUMMARY OF THE INVENTION

The new and improved desk structure provided herein by applicant may take various forms as will be subsequently set forth in detail, and a presently preferred embodiment of the invention comprises a tub-like plastic housing pivotally mounted at one end upon fixed vehicular structure. The housing supports therein a personal communicator, which may be a cellular telephone together with power means therefor, and if desired, other office-related accessories exemplified by a telecopier, pager, computer and the like. The formed plastic housing may slidably support a cover member mounting thereon a writing tablet or the like. A further novel feature of this invention is a ratchet and lock arrangement or equivalent means cooperatively connected to the pivotal mounting means for the desk structure. A device of this general character permits ready adjustability of the desk for safety and comfort reasons, and precludes excessive desk movement during relatively high speed vehicular travel.

BRIEF DESCRIPTION OF THE DRAWINGS

FIG. 3 is a top plan view of the desk structure of FIG. 1 in a closed position;

FIG. 4 is a view similar to FIG. 3, and showing a preferred form of applicant's invention in an open position;

FIG. 5 is a fragmentary top plan view showing in more detail the ratchet and lock means of the preceding views;

FIG. 6 is a vertical sectional view taken substantially along the line 6—6 of FIG. 3;

FIG. 7 is an exploded perspective view of another form of applicant's invention;

FIG. 8 is a perspective view of the desk structure of FIG. 7 showing applicant's device in a position of use; and FIG. 9 is a perspective view of the desk of the two preceding views and showing the same in a closed position.

DESCRIPTION OF A PREFERRED EMBODIMENT

Figure 1:
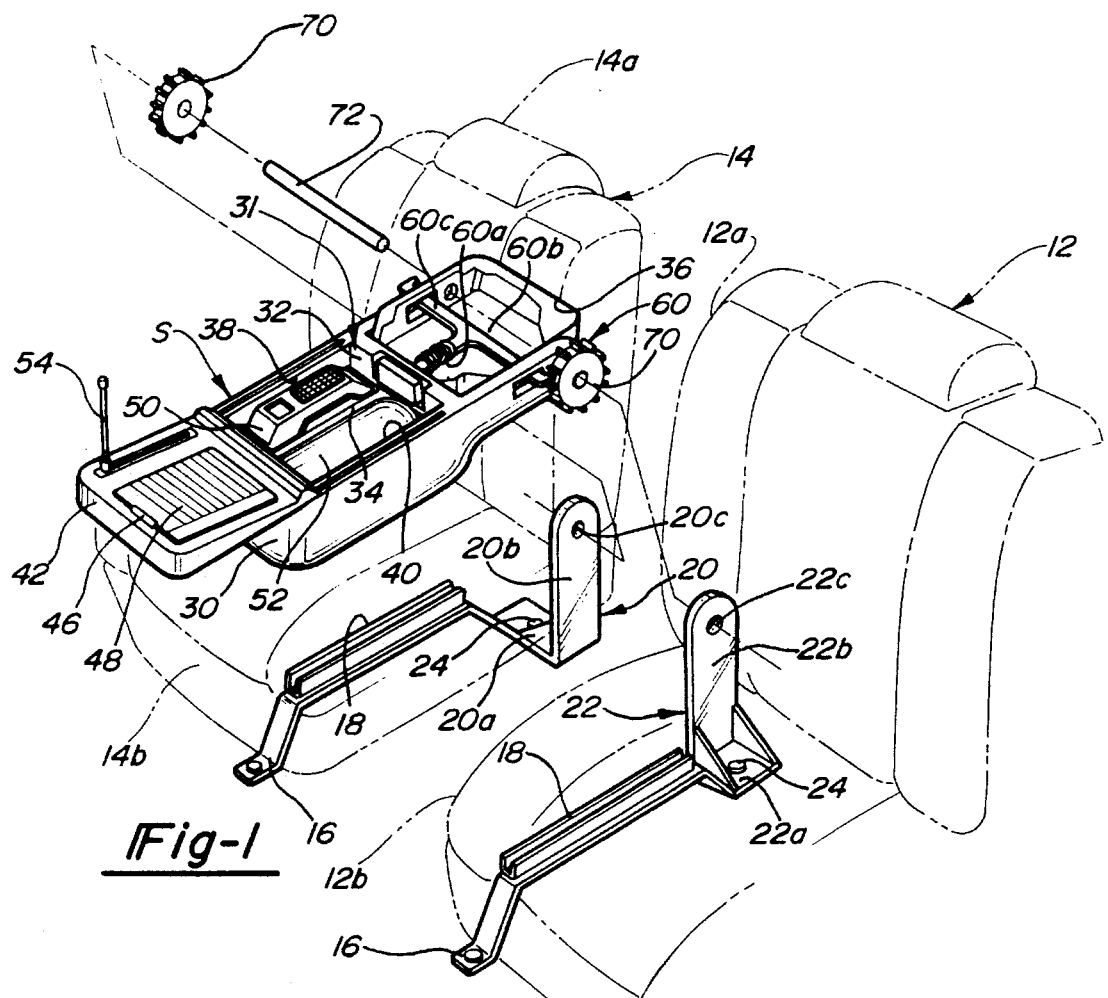
FIG. 1 is a perspective view, partially exploded, showing in full lines a preferred form of applicant's invention in an exemplary environment of side by side vehicular seats portrayed by dotted lines.

Referring now to the drawings, and first to FIG. 1 thereof, a pair of vehicular seats 12 and 14 of the bucket seat type positioned in spaced side by side relation may provide an exemplary environment for the present invention. Although applicant's contribution to the art will be described in connection with automobiles, and particularly the front section thereof, it will be appreciated that the present invention is of application to land, sea and air vehicles, and to both the operator and passenger compartments thereof.

As is known in the art, seats 12 and 14 comprise back and seat portions 12a and 12b and 14a and 14b, respectively. By way of illustration, forward and rearward adjustable movement of seats 12 and 14 may be effected through provision of support means 16 secured to vehicular structure (not shown), the support means 16 being equipped with guide rails 18, if desired.

The vehicular structure may also provide support for angularly shaped bracket means 20 and 22, formed to include base portions 20a and 22a, and upstanding body portions 20b and 22b, each of which is passaged at 20c and 22c, respectively. Fastening means 24 are employed to effect firm securement of bracket means 20 and 22 to vehicular structure.

In the preferred embodiment of the invention shown in FIGS. 1–6, bracket means 20 and 22 provides, in combination with other structure, an effective mounting arrangement for applicant's desk structure, designated generally in the drawings by the legend S. The desk structure as illustrated in these views comprises a tub-like base or body portion 30 having a cavity 31 formed therein interiorly divided by upright wall sections 32 and 34 into a plurality of chambers or compartments 36, 38 and 40. The desk base portion 30 adjacent the compartments 38 and 40, and along the upper marginal segment thereof, may be formed with tongue portion 30a for slidable movement thereon of cover or top members 42, which is of course contoured as at 42a on the underside thereof for cooperative engagement with tongue 30a on the upper portion of the desk body portion 30.

The cover member 42 on the upper surface thereof may be provided with a pair of cavities 44 for the reception therein of a pair of beverage containers (not shown), exemplified by coffee cups or soft drink cans. The upper surface of the cover member 42 may also mount in securement thereto clip means or the like 46 for engaging writing tablet 48. If desired, the cover member 42 may be recessed in this location to more completely receive the writing tablet 48.

Referring again to the chambers or compartments 36, 38 and 40 provided by upright wall sections 32 and 34 integral with the tub-like body portion 30, compartment 38 houses or receives therein mobile telephone 50 electrically connected to transceiver means 52 received in compartment 40. Transceiver means 52 is electrically connected to a 12 volt source, which may be the cigarette lighter (not shown) mounted on vehicle structure. The transceiver 52 may be one of many commercially available units, and exemplary thereof is one identified as Model N52712A by its manufacturer, Motorola, Inc. Transceiver means 52 is electrically connected to antenna means 54 supported by desk cover member 42 and hingedly connected thereto.

It will be appreciated that the cellular telephone 50 may be of the wired or wireless type, independent of or in association with a computer, consumer electronic means, or information services means. In other words, applicant's desk structure S may be effectively utilized in association with a wide variety of personal communication systems.

As earlier stated, the desk structure S of this invention may incorporate, as an additional feature thereof, means for adjusting the position of the desk structure and preferably embodying position locking means. A device effective to accomplish these desirable purposes may be referred to as lockable position adjustment means, and is designated generally in FIGS. 1 to 5 by the numeral 60.

As is shown therein, adjustment means 60 is generally T-shaped when viewed in plan, comprising a relatively slender body portion 60a and essentially identical arm portions 60b and 60c extending outwardly therefrom. The adjustment means 60 is positioned in compartment or cavity 36 provided by upright wall portion 32, and said wall portion 32 may have an opening 32a formed therein to receive body portion 60a of the adjustment or actuating means 60. A recess or cavity 32b may also be formed in the upright wall portion 32 to receive a knob 62 mounted upon relatively slender body portion 60a of adjustment means 60, the body portion 60a receiving spring means 64, if desired.

Opposed side wall portions 30b and 30c of the tub-like body member 30 have essentially identical elongated openings 66 formed therein to receive outwardly extending arm portions 60b and 60c of adjustment or actuating means 60, the extremities of the arm portions being angularly directed as at 68 for engagement with toothed wheels or sprocket means 70 carried by shaft means 72 received in openings 20c and 22c of bracket means 20 and 22 fixed to vehicle structure, which may be the floor portion thereof.

Figure 2:
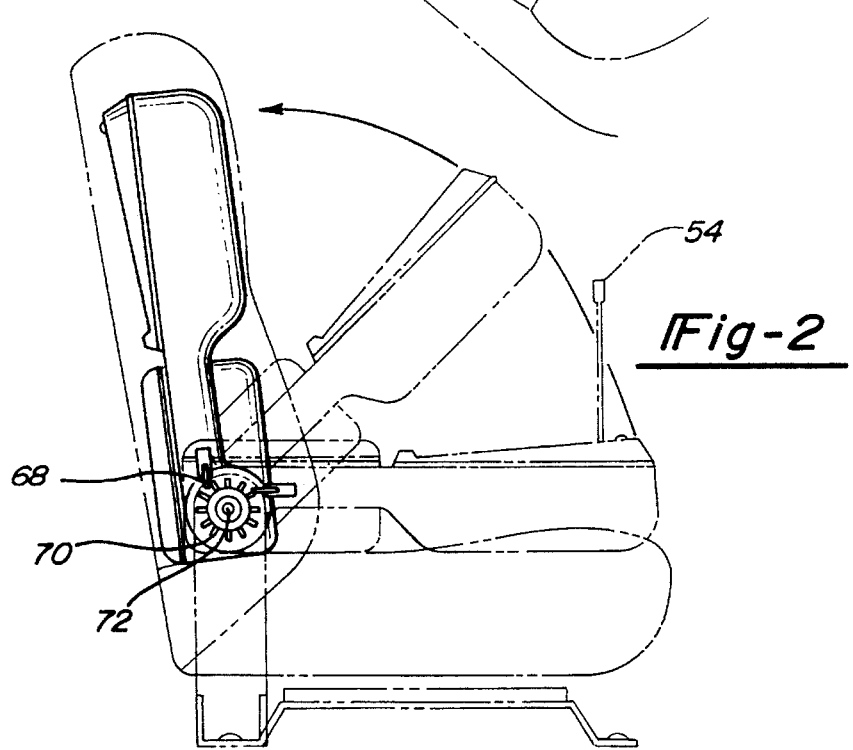
FIG. 2 is an end view of the desk structure of this invention in different positions of adjustment, and showing in detail one form of ratchet and lock means.

It is believed now apparent that should adjustment of the position of the desk structure S be desired, either for the comfort or convenience of the user, it is only necessary to withdraw the tab or tongue portions 68 of the T-shaped adjustment means from the sprocket wheel 70 in the direction of the arrows appearing in FIGS. 4 and 5. The desk structure S may then be angularly directed or swung upon the fixed pivot provided by the shaft means 72. The spring-pressed adjustment means 60 may then be released to engage the tab means 68 into the desired location upon the sprocket means 70. Various positions of adjustment of the desk structure S are shown in FIG. 2 of the drawings, and it is believed not manifest that when the desk structure S is in an elevated position, the desk is essentially locked in this position. Safety in use is accordingly a further advantage of the present invention.

A further embodiment of the invention is shown in FIGS. 7, 8 and 9, to which reference is now made, and wherein like numerals raised by the factor "100" have been employed to designate like parts shown in FIGS. 1 to 6. While not specifically shown in FIGS. 7, 8 and 9, the adjustment means generally designated at 60 in the preceding views may also be utilized in the structural arrangement of FIGS. 7, 8 and 9, if desired.

Desk structure S-1 shown in FIGS. 7, 8 and 9 may be employed in association with an arm rest, which may or not be swingable from a down to up position, or may be utilized in association with a rigid console. In either case, the desk structure of the present invention is constructed to be seated in a cavity formed in the arm rest or console, and is accordingly a departure from the inventive concept disclosed in my U.S. Pat. No. 5,085,153. As shown and described therein, the patented desk structure is constructed to be removably seated in the console area of a vehicle, preferably in snug fitting contact with the tiltable arm rest between the driver and passenger seats. The described desk structure comprises a generally box-like base framework fixedly mounting thereon a substantially flat top member provided with a plurality of cavities for receiving such objects as a writing tablet, cushion means, and mobile telephone or other communication apparatus.

Applicant has now discovered that an existing or conventional arm rest or console may provide a convenient location for a desk structure by providing in the arm rest or console a shaped cavity for the reception therein of a complimentarily contoured base of a desk structure equipped with personal communication apparatus and related accessories displayed upon the patented desk structure.

With reference again to FIGS. 7 to 9, desk structure S-1 comprises a generally tub-like base portion 80 having a cavity 82 formed therein for removably receiving a storage tray 84 and hinged arm rest storage lid 86. Base portion 80 of desk structure S-1 is pivotally connected at 122c to bracket means 122 for swingable movement, as is believed now apparent. Base portion may also support cushion means 88.

Received within the cavity 82 of tub-like base portion 80 in snap-fitting engagement therewith is body portion 90 of desk structure S-1, the body portion 90 being integrally associated with a table top member 92 formed to provide cavities for reception of a mobile telephone 94, slidable writing tablet 96, and other accessories (not shown) earlier described. Transceiver means (not shown) may be housed in the cavity 82 in electrical connection with a mobile telephone 94 and a power source, which may be the cigarette lighter (not shown).

The cavity 82 is bounded by side wall portions 80b and 80c of the base portion 80. Formed in an interior surface of the side wall portion 80c facing into the cavity 82 is a recess 80a and a similar recess (not shown) is formed in an interior surface of the side wall portion 80b. The body portion 90 has a side wall portion 90b which faces the side wall portion 80b when the body portion 90 is inserted into the cavity 82. An outwardly extending protuberance 90a is formed on the sidewall portion to releasably engage the recess (not shown) in the side wall portion 80b. A similar protuberance (not shown) is formed on the opposite side wall portion (not shown) of the body portion 90 to releasably engage the recess 80a.

The body portion 30 of the desk structure S earlier described, and the base and body portions 88 and 90 of the desk structure S-1, are preferably formed of a thermoplastic polymer. A presently preferred material is ABS resin (acrylonitrile-butadiene-styrene copolymer). Thermoforming is the presently preferred molding method. Other thermoplastic resins and forming methods are of course within the scope of the present invention.

The overall configuration of the desk structures S and S-1, and their position with respect to the driver and passenger, are based to a large degree upon ergonomics or human engineering. The characteristics of people, exemplified by the average or typical operator or driver, were considered in designing the total desk structure and arrangement of accesories to be positioned thereon, in order that people and the desk structure interact most effectively and with maximum safety. In other words, the objective is that the driver may effectively utilize the accessories available upon the desk structure without interference with safe operation of the vehicle.

The desk structures disclosed herein also feature ready transportability from a vehicle to a home or office, wherein the desk structure may be employed in essentially the same manner as in an automobile. Connections between the desk and vehicle may be made or broken in a relatively short period of time, and use of the desk structure in home or office initiated with minimum of time and effort.

Variations to the present invention have been described herein, and these and other modifications may of course be effected without departing from the spirit of the invention or the scope of the subjoined claims. As illustrative variations, the desk structures $\underline{S}$ and $\underline{S\text{-}1}$ may be employed in association with either the front or rear seats of an automobile, and may be upholstered or in other manner decorated so as to blend with the interior treatment of the automobile.

I claim:

1. A desk structure for pivotal mounting between a pair of spaced side by side seats in a driver-operated vehicle comprising:

a base portion having at least one open top cavity formed therein;

a mounting means for attachment to a fixed vehicle structure, said base portion being pivotally attached to said mounting means for swingable movement along an arcuate path between a down position and an elevated position;

a body portion being contoured for close fitting contact within said open top cavity and having a table top member with at least one cavity formed therein for receiving a mobile telephone;

at least one recess formed in an interior surface of a wall of said base portion and facing into said open top cavity; and an outwardly extending protuberance formed on an exterior surface of a wall of said body portion whereby when said body portion is inserted into said open top cavity, said protuberance releasably engages said recess for retaining said body portion and when said mounting means is attached to a fixed vehicle structure between a pair of spaced apart seats, said table top member and said cavity formed therein are accessible for use by persons sitting in the seats.

2. The desk structure according to claim 1 wherein said table top member includes a cavity for retaining a writing tablet.

3. The desk structure according to claim 1 including a storage tray adapted to be received by said open top cavity upon removal of said body portion from said open top cavity.

4. The desk structure according to claim 1 including an arm rest storage lid for closing said open top cavity and adapted to be hingedly attached to said base portion upon removal of said body portion from said open top cavity.

5. The desk structure according to claim 1 including a cushion means attached to said base portion adjacent said open top cavity.

6. The desk structure according to claim 1 including adjusting means attached to said base portion and said mounting means for selectively retaining said base portion in a plurality of selected positions along said path of swingable movement.

7. A desk structure for pivotal mounting between a pair of spaced side by side seats in a driver-operated vehicle comprising:

a base portion having at least one open top cavity formed therein for receiving a mobile telephone;

a mounting means for attachment to a fixed vehicle structure, said base portion being pivotally attached to said mounting means for swingable movement along an arcuate path between a down position and an elevated position;

a top member slidably attached to said base portion for movement between a first position covering said open top cavity and a second position exposing said open top cavity; and an adjusting means attached to said base portion and said mounting means for selectively retaining said base portion in a plurality of selected positions along said path of swingable movement, said adjusting means including a shaft means connected to said mounting means, sprocket means connected to said shaft means, and actuating means attached to said base portion and engageable with said sprocket means to lock said base portion in a selected one of a plurality of positions along said path of swingable movement.

8. The desk structure according to claim 7 including a cushion means attached to said base portion adjacent said open top cavity.

9. The desk structure according to claim 7 wherein said top member includes a cavity for retaining a writing tablet.

10. The desk structure according to claim 7 wherein said actuating means includes a body portion positioned in said base portion and at least one arm portion attached at one end to said body portion and having an opposite end extending through an opening formed in a wall of said base portion, said opposite end of said arm portion engaging said sprocket means for selecting said plurality of positions.

11. The desk structure according to claim 10 wherein said actuating means includes a spring means mounted on said body portion of said actuating means for biasing said opposite end of said arm portion into engagement with said sprocket means.

12. The desk structure according to claim 11 wherein said actuating means includes a knob attached to said body portion of said actuating means for grasping by a human hand to withdraw said opposite end of said arm portion from engagement with said sprocket means and release said base portion for movement along said path of swingable movement.

13. The desk structure according to claim 7 including a pair of tongue portions formed on an upper surface of said base portion adjacent said open top cavity and wherein an underside of said top member is contoured to engage said tongue portions to permit said movement of said top portion between said first and second positions.

14. A desk structure for mounting between a pair of spaced side by side seats in a driver-operated vehicle comprising:

a base portion having at least one open top cavity formed therein;

a mounting means for attachment to a fixed vehicle structure;

a body portion being contoured for close fitting contact within said open top cavity and having a table top member with at least one cavity formed therein for receiving a mobile telephone;

a pair of recesses each formed in an interior surface of an associated wall of said base portion and facing into said open top cavity; and a pair of outwardly extending protuberances each formed on an exterior surface of an associated wall of said body portion whereby when said body portion is inserted into said open top cavity, each of said protuberances releasably engages an associated one of said recesses for retaining said body portion and when said mounting means is attached to a fixed vehicle structure between a pair of spaced apart seats, said table top member and said cavity formed therein are accessible for use by persons sitting in the seats.

15. The desk structure according to claim 14 wherein said table top member includes a cavity for retaining a writing tablet.

16. The desk structure according to claim 14 including a storage tray adapted to be received by said open top cavity upon removal of said body portion from said open top cavity.

17. The desk structure according to claim 14 including an arm rest storage lid for closing said open top cavity and adapted to be hingedly attached to said base portion upon removal of said body portion from said open top cavity.

18. The desk structure according to claim 14 including a cushion means attached to said base portion adjacent said open top cavity.

19. The desk structure according to claim 14 wherein said base portion is pivotally attached to said mounting means for swingable movement along an arcuate path between a down position and an elevated position.

20. The desk structure according to claim 19 including adjusting means attached to said base portion and said mounting means for selectively retaining said base portion in a plurality of selected positions along said path of swingable movement.

* * * * *